United States Patent [19]

Meyers

[11] Patent Number: 5,682,266
[45] Date of Patent: Oct. 28, 1997

[54] BLUR FILTER FOR ELIMINATING ALIASING IN ELECTRICALLY SAMPLED IMAGES

[75] Inventor: Mark M. Meyers, Hamlin, N.Y.

[73] Assignee: Eastman Kodak Company, Rochester, N.Y.

[21] Appl. No.: 417,422

[22] Filed: Apr. 5, 1995

[51] Int. Cl.$^6$ .................. G02B 5/18; H01L 27/00
[52] U.S. Cl. .............. 359/571; 359/575; 250/208.1
[58] Field of Search ................... 359/566, 569, 359/571, 575, 565, 20; 250/208.1

[56] References Cited

U.S. PATENT DOCUMENTS

| | | | |
|---|---|---|---|
| 3,910,683 | 10/1975 | Nishino et al. | 350/162 SF |
| 4,009,939 | 3/1977 | Okano | 350/162 SF |
| 4,083,627 | 4/1978 | Okano | 350/162 SF |
| 4,093,346 | 6/1978 | Nishino et al. | 350/162 SF |
| 4,318,123 | 3/1982 | Knop | 358/43 |
| 4,323,925 | 4/1982 | Abell et al. | 358/213 |
| 4,377,753 | 3/1983 | Mir | 250/578 |
| 4,689,291 | 8/1987 | Popovic et al. | 430/321 |
| 4,708,436 | 11/1987 | Kleinknecht | 350/162.17 |
| 4,733,096 | 3/1988 | Horiguchi | 250/578 |
| 4,795,236 | 1/1989 | Ise | 350/162.2 |
| 4,878,737 | 11/1989 | Ise | 350/167 |
| 4,989,959 | 2/1991 | Plummer | 350/447 |
| 4,994,664 | 2/1991 | Veldkamp | 359/565 |
| 4,998,800 | 3/1991 | Nishida et al. | 350/162.2 |
| 5,004,901 | 4/1991 | Yoshimoto et al. | 250/201.5 |
| 5,029,010 | 7/1991 | Shiraishi | 358/225 |
| 5,046,827 | 9/1991 | Frost et al. | 359/54 |
| 5,076,687 | 12/1991 | Adelson | 356/4 |
| 5,121,213 | 6/1992 | Nishioka | 358/213.11 |
| 5,151,790 | 9/1992 | Takatori et al. | 358/225 |
| 5,187,358 | 2/1993 | Setani | 250/208.1 |
| 5,233,174 | 8/1993 | Zmek | 250/201.9 |
| 5,233,431 | 8/1993 | Yoshida et al. | 358/227 |
| 5,280,388 | 1/1994 | Okayama et al. | 359/569 |
| 5,283,691 | 2/1994 | Ogasawara | 359/566 |
| 5,309,239 | 5/1994 | Bouwhuis | 348/265 |
| 5,322,998 | 6/1994 | Jackson | 250/216 |
| 5,340,978 | 8/1994 | Rostoker et al. | 250/208.1 |
| 5,349,471 | 9/1994 | Morris et al. | 359/565 |
| 5,471,515 | 11/1995 | Fossum et al. | 377/60 |
| 5,497,269 | 3/1996 | Gal | 359/566 |
| 5,504,621 | 4/1996 | Okayama et al. | 359/569 |
| 5,529,936 | 6/1996 | Rostoker | 437/2 |

FOREIGN PATENT DOCUMENTS

| | | | |
|---|---|---|---|
| A-0584769 | 2/1994 | European Pat. Off. | G02B 5/20 |
| 8-107194 | 10/1994 | Japan | H01L 27/14 |
| A-06 308430 | 11/1994 | Japan . | |
| A-06 334159 | 12/1994 | Japan . | |

OTHER PUBLICATIONS

"Visible Array Detectors" by Timothy J. Tredwell, from Handbook of Optics, Vo. 1, Fundamentals, Techniques & Design, Second Edition, Chapter 22, pp. 32–34.

*Primary Examiner*—Jon W. Henry
*Attorney, Agent, or Firm*—Edward Dugas

[57] ABSTRACT

A blur filter for use with a multi-element electro-optical sensor is formed with a plurality of diffractive elements positioned adjacent each other with each of the elements being comprised of uniformly spaced concentric diffractive features. The plurality of diffractive elements are secured in a plane near the sensing surfaces of a multi-element electro-optical sensor. Each element of the multi-element sensor has a plurality of sensing surfaces for receiving incident light from a plurality of diffractive features.

11 Claims, 7 Drawing Sheets

BLUR FILTER FOR ELIMINATING ALIASING IN ELECTRICALLY SAMPLED IMAGES

FIELD OF THE INVENTION

The invention relates generally to the field of optical low pass filters, and more specifically, to blur filters for use with electro-optical sensors.

BACKGROUND OF THE INVENTION

Digitally sampled images of object with large amounts of high spatial frequency content (fine detail) sometimes appear to have a problem with artifacts which consist of (falsely) colored bands which move with the object. The phenomena which produces these artifacts is known as aliasing and is a result of trying to sample images which have an information content that is beyond the nyquist frequency of the sensor ($f_{nyquist}=1/(2*S)$ where S=spacing between detector elements). Typically, this problem is addressed by blurring the image to reduce high spatial frequency information content using a pair of birefringent quartz plates which produce four spots for every single spot which would normally be produced. These birefringent quartz plates (blur filters) are relatively expensive and bulky and must be positioned in front of the camera or between the camera's lens and detector plane.

SUMMARY OF THE INVENTION

The present invention is directed to overcoming one or more of the problems set forth above. Briefly summarized, according to one aspect of the present invention there is provided a blur filter for use with a multi-element electro-optical sensor comprising:

a plurality of diffractive elements positioned adjacent each other, each of said elements comprised of concentric diffractive features;

a multi-element electro-optical sensor wherein each element has a sensing surface for receiving incident light with each element arranged to receive the light from a diffractive element; and means for spacing the plurality of diffractive elements in a plane near the sensing surfaces of the multi-element electro-optical sensor.

More specifically the invention consists of utilizing an array of conical gratings with dimensions which are at least 2 times as big as the separation of the pixels on the detector array placed near the detector array to generate blurred spots which prevent aliasing by scrambling, blurring, and mixing the information incident on the pixels for frequencies which are higher than the nyquist frequency. The above and other objects of the present invention will become more apparent when taken in conjunction with the following description and drawings wherein identical reference numerals have been used, where possible, to designate identical elements that are common to the figures.

The present invention has the following advantages:

The invention provides for a way to eliminate aliasing (and observable color fringing) from digitally sampled images with a relatively low cost array of conical gratings. The conical gratings generate blurred and scrambled intensity distributions for spatial features which are above the nyquist frequency without significantly degrading the image sharpness for frequencies below the nyquist frequency. An array of conical gratings placed on the inside of the cover glass for the detector array or on the array itself in an integrated CCD package at a low cost. The array of conical gratings are very thin and compact when compared to prior art quartz blur filters. The present blur filter is also insensitive to object position unlike techniques which simply place the lens out of focus or the use of an array of randomly defocused lenslets. The conical grating array is also relatively insensitive to alignment of the array to the pixels on the CCD array.

BRIEF DESCRIPTION OF THE DRAWINGS

FIG. 6 illustrates a diffractive feature having unfilled spaces there between;

DETAILED DESCRIPTION OF THE INVENTION

Figure 1:
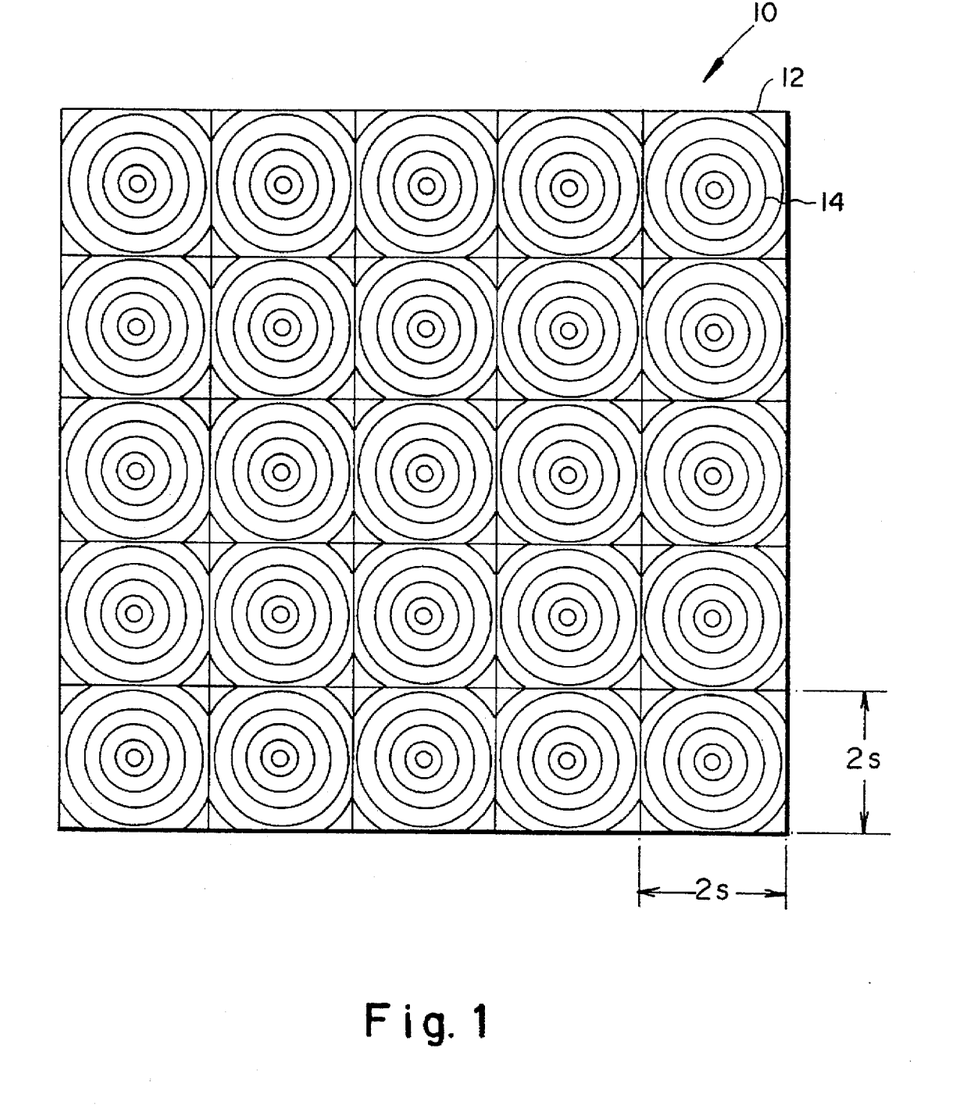
FIG. 1 illustrates a matrix array of diffractive elements.

Referring to FIG. 1, the blur filter (diffractive element matrix array) 10 of the present invention is comprised of a plurality of diffractive elements 12 positioned adjacent to each other in a matrix. Each diffractive element 12 is formed as a series of concentric grating elements (concentric diffractive feature) 14. The grating elements may also be referred to as blazed grating elements. The configuration of the matrix is based on the configuration of the multi-element electro-optical sensors that are to be serviced by the matrix. In the preferred embodiment of the invention each of the diffractive elements 12 services 2 or more pixels in a manner to be described. For reference purposes the matrix 10 in the realized embodiments of the invention is formed of 375×250 and 750×500 diffractive elements 12.

Figure 2:
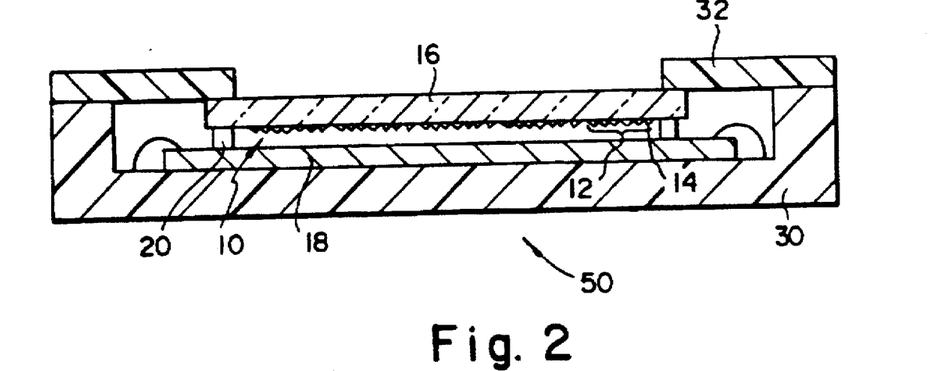
FIG. 2 is a sectional view of a CCD array package incorporating the blur filter.

FIG. 2 illustrates the physical arrangement of the blur filter 10 in a package 50 with a multi-element electro-optical sensor 18. The blur filter 10 is positioned in a plane that is parallel to the plane of the sensor 18 by means of spacers 20. The blur filter, spacers 20, and sensor 18 are protected by a package formed of a base 30 and a sealing plate 32. In the configuration shown each of the diffractive elements 12 is attached to the support base 16 that is an optically clear material.

Figure 3:
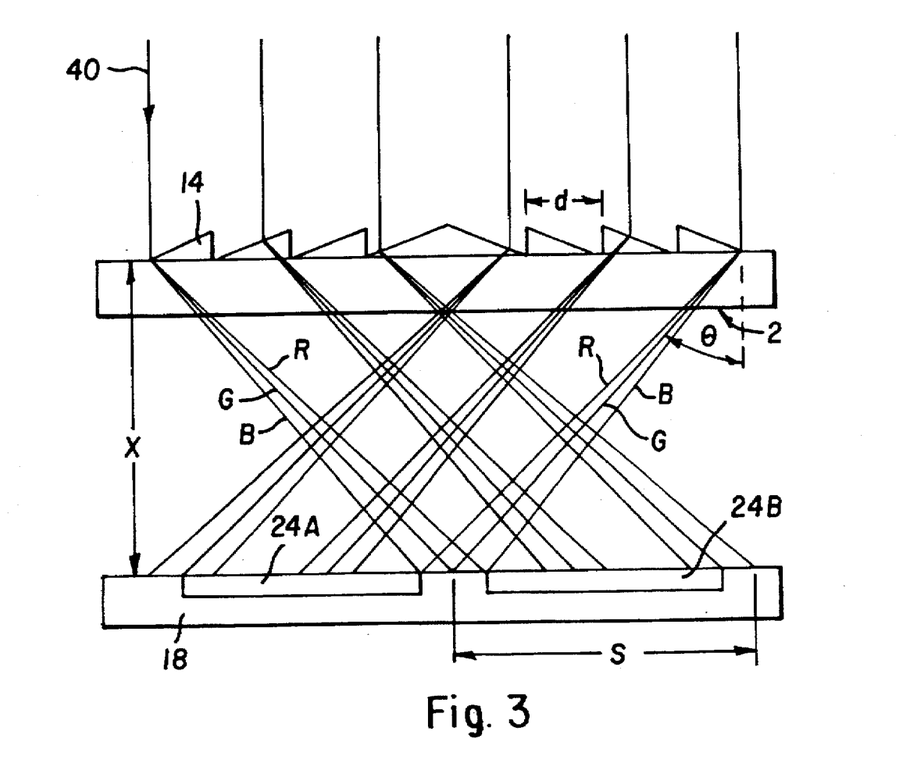
FIG. 3 is a diagram illustrating the diffracted angles of incident light onto two electro-optical sensor elements.

FIG. 3 schematically represents the positioning of a single diffractive element 12 with respect to two electro-optical sensor elements 24A and 24B. The diffractive element 12 consists of concentric grating features 14 with equal spacing between rings wherein a light ray 40 incident on the grating is diffracted according to the grating equation:

$$\sin\theta_x - \sin\theta_i = m\theta/d$$

where $\theta_i$ = angle of incidence
$\theta_x$ = angle of diffraction
m = diffraction order (0, ±1, ±2, ...)
$\theta$ = wavelength of interest
d = spacing between grating features The spacing d of the grating is adjusted to diffract light from the edge of the diffractive element towards the center of the diffractive element (which also diffracts from the center of the diffractive element out to its edge). Grating spacings d which direct rays from the center of the diffractive element from halfway to 1.5 times the distance to the edge can also be used successfully.

For a given separation X (typically less than 500 μm) of the multi-element electro-optical sensor 18 from the diffractive element 12 the desired grating spacing d can be found from:

$$\tan\theta_x = X/S \text{ (or } 0.5*S \text{ to } 1.5*S)$$

$$\theta_x = \tan^{-1}(X/S)$$

$$\theta_x = \sin^{-1}(m\lambda/d + \sin\theta_i)$$

$$d = m\lambda/(\sin(\tan^{-1}(X/S)) + \sin\theta_i)$$

S = represents the center-to-center distance between elements 24A and 24B.

Therefore a good choice for the grating element spacing d is:

$$d = m\theta/[\sin(\tan^{-1}(X/S))]$$

The diffraction angle will be a function of the wavelength of the incident light. Nominally the diffraction angle will be chosen at the center of the wavelength band. For visible application this will be in the center of the green band at approximately 550 nanometers.

If the spacing between diffractive elements is at 2*S and the array is near the CCD detector, the invention will not greatly degrade the information content of the image at frequencies below the nyquist frequency as most blur filters do (i.e., quartz birefringent blur filters). This will allow the image sharpness to be maintained for frequencies below the nyquist without having the image demonstrate aliasing. In certain instances it may be desirable to define S as being the distance between like or similar color sensor elements.

Figure 4A:
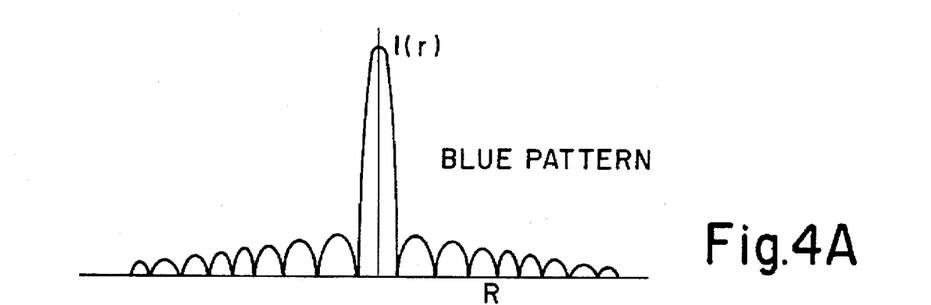
FIGS. 4A–4D illustrates the resultant intensity patterns for the red green and blue components of the incident light and the summation of them for the white pattern.
Figure 4B:
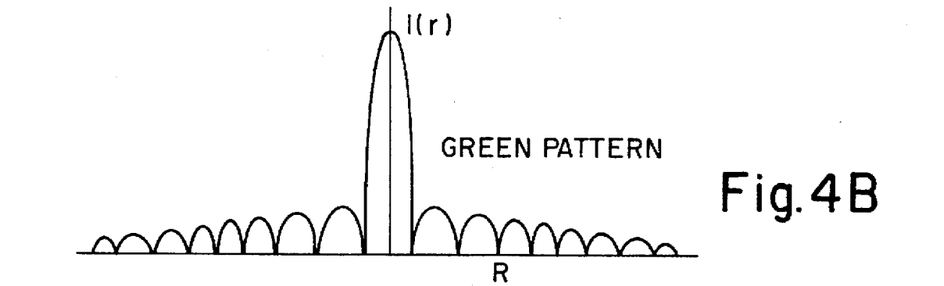
Figure 4C:
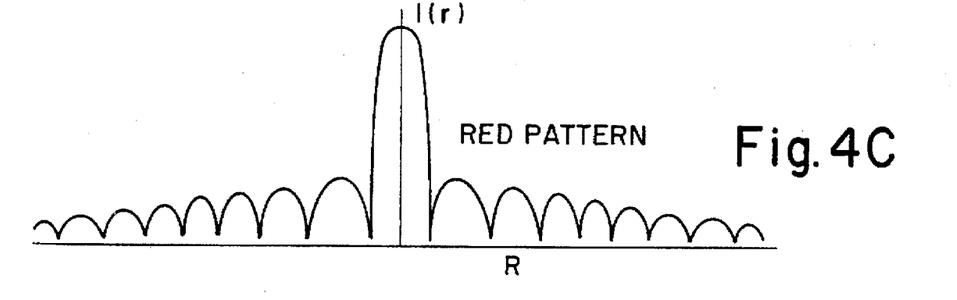
Figure 4D:
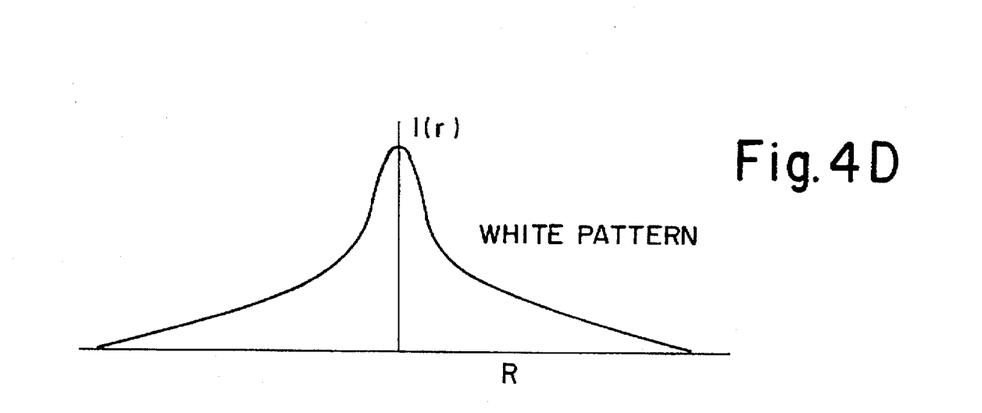

Referring to FIGS. 4A to 4D, the intensity patterns formed by the blue, green and red light, respectively, illustrates that the extent of the intensity distribution increases radially with wavelength. The final intensity distribution shown in FIG. 4D, is the sum of the individual distributions. This intensity distribution represents a blur feature that does not contain frequency components greater than the nyquist frequency and therefore is not subject to aliasing and/or false color moiré patterns.

Figure 5A:
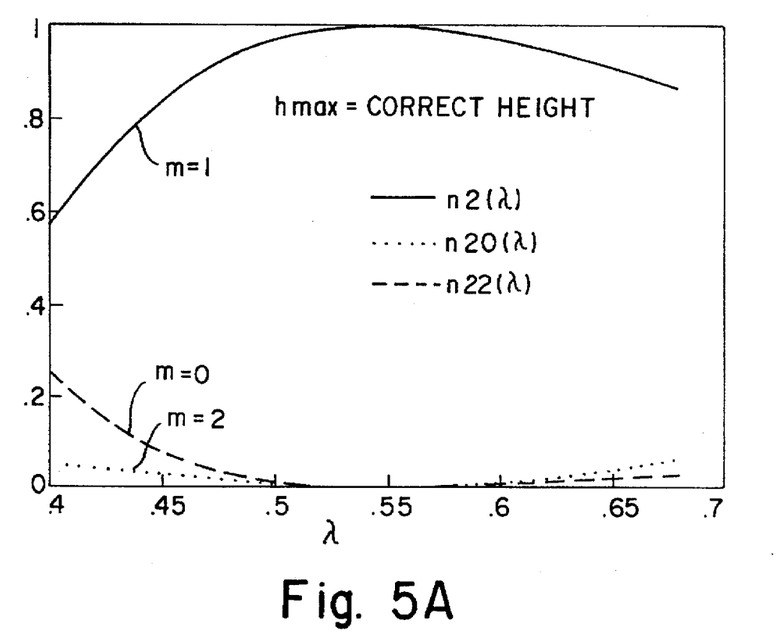
FIGS. 5A and 5B are graphs illustrating the diffraction efficiency of triangularly blazed elements as a function of wavelength at two selected heights.

Referring to the graph of FIG. 5A, the conical grating diffraction efficiency as a function of wavelength is a strong function of the profile of the diffractive features. A triangularly blazed grating will provide the maximum efficiency if $h_{max} = \theta_0/[n(\theta_0) - 1]$ where $\theta_0$ is the design wavelength. Light diffracted into the first order is represented by the curve m=1 and light diffracted into the second order and undiffracted light are represented by the curves m=2 and m=0, respectively.

Figure 5B:
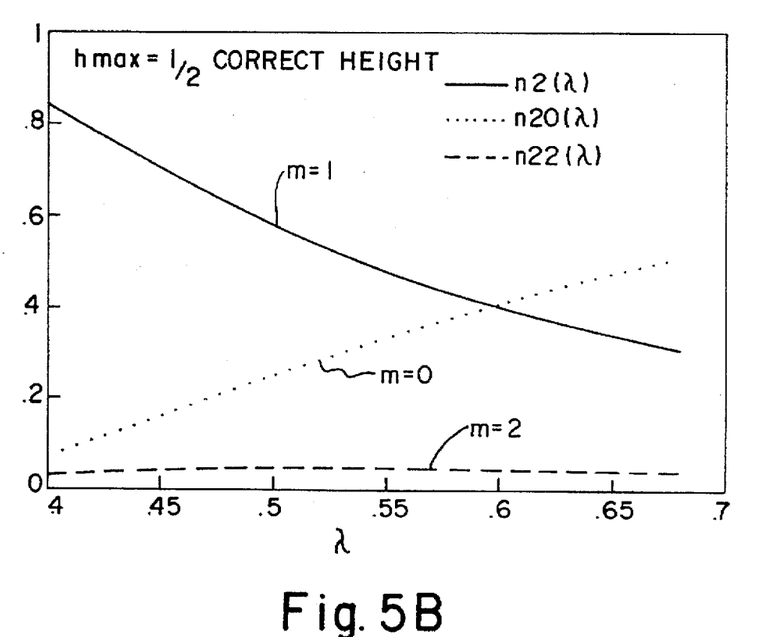

The graph of FIG. 5B illustrates that by reducing the height $h_{max}$ the amount of undiffracted light (m=0) can be increased which will mix with the diffracted light (m=1, m=2) and further blur the intensity profile. FIG. 9B illustrates a diffractive element with the features being $\frac{1}{2}h_{max}$.

Figure 6:
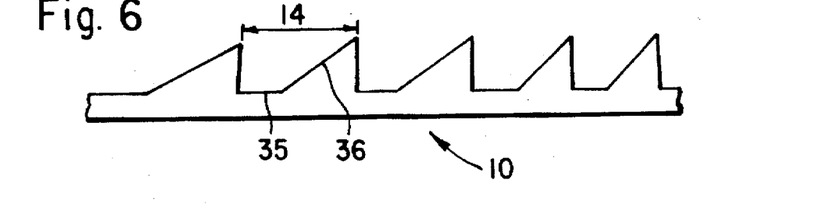

Referring now to FIG. 6, by allowing some fraction (20%, 40%, etc.) of the light to pass straight through the diffractive element the resultant intensity profile will be a mixture of diffracted and undiffracted light. More specifically, this can be achieved by changing the filled fraction 36 of the diffractive feature 14 vs. the unfilled space 35 between features.

Figure 7:
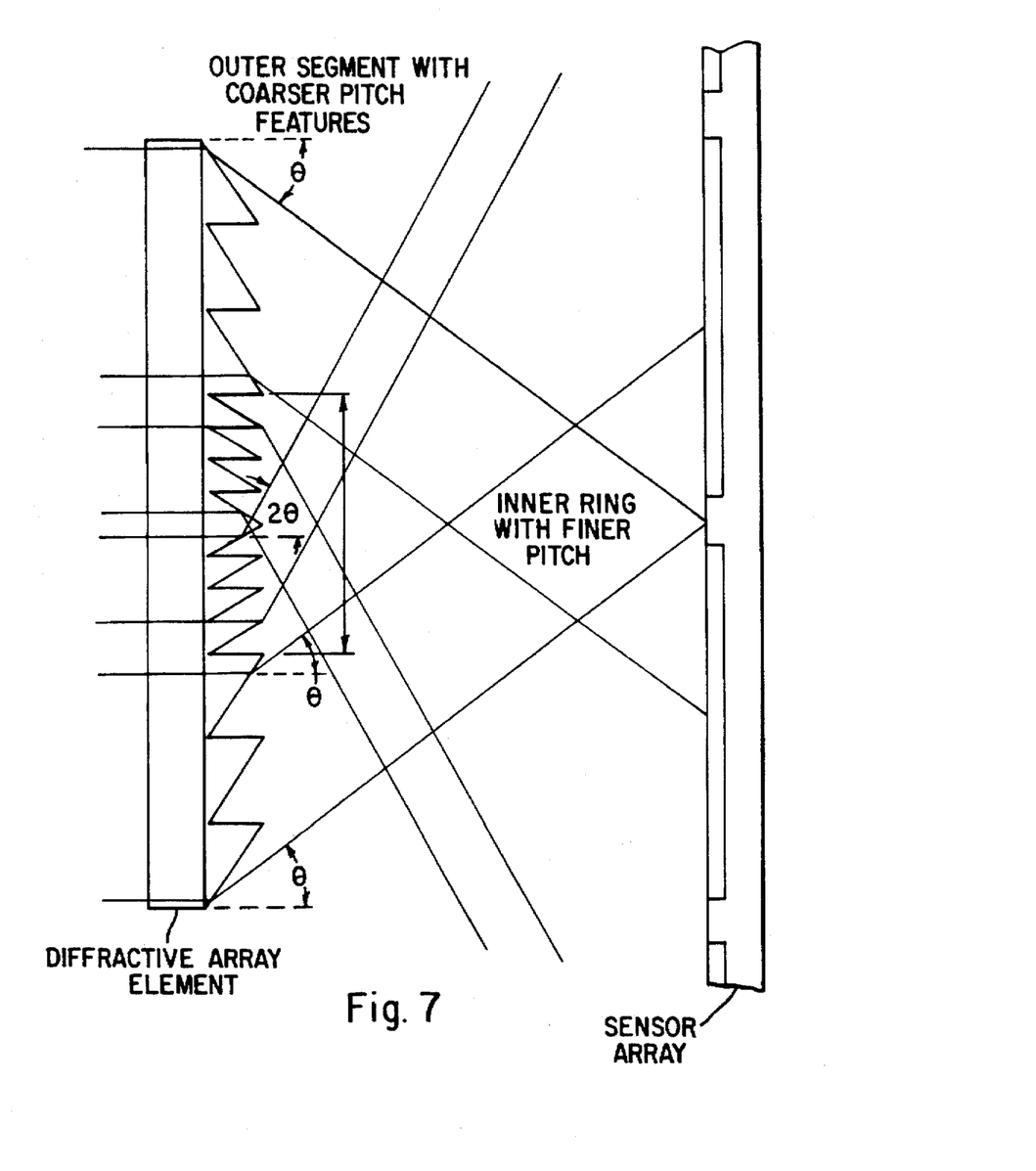
FIG. 7 illustrates the diffracted angles of incident light from a diffractive element having features with multiple pitches onto two electro-optical sensor elements.

Referring now to FIG. 7, another way to increase blurring and decrease image structure is to make the inner section of the conical grating at a different pitch than the outer pitch, and/or with a different diffractive surface profile. This would allow the invention to use gratings which diffracted significant energy into the m=±1 and m=±2 orders near the center of the element while using diffractive structures which diffracted light mostly into the m=1 and m=0 orders near the edge of the aperture.

Figure 8:
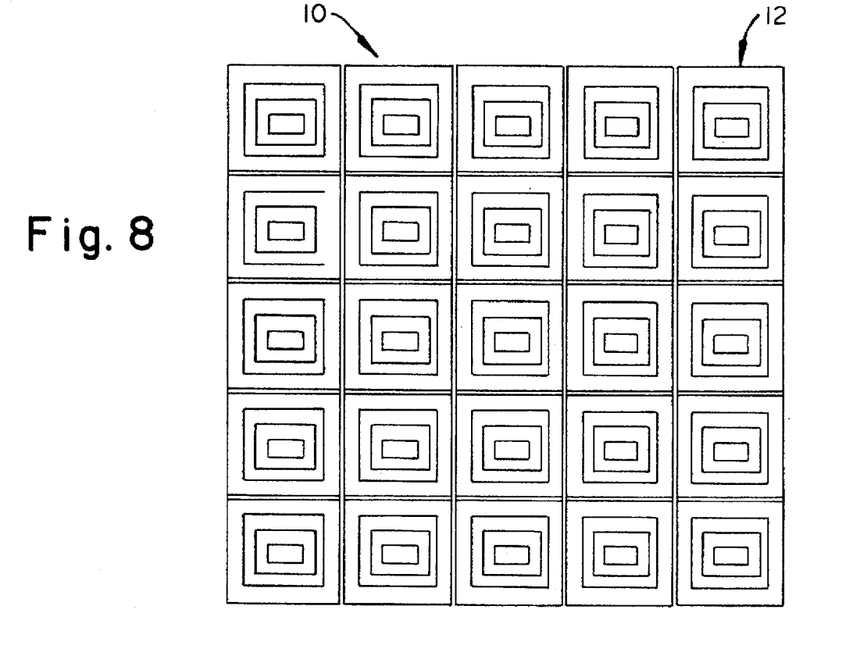
FIG. 8 illustrates a matrix array of diffractive elements formed as concentric rectangular features.

FIG. 8 illustrates a matrix array 10 formed with rectangular diffraction elements 12.

Figure 9A:
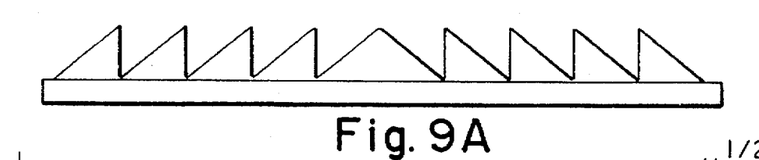
FIGS. 9A through 9D illustrate various configurations for the diffractive features.
Figure 9B:
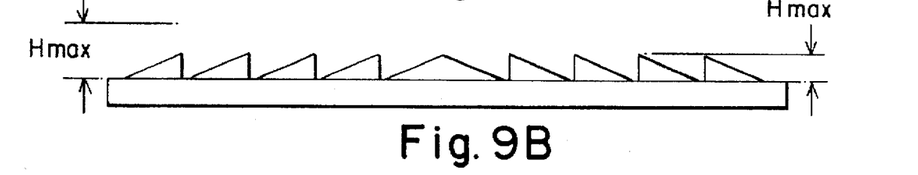
Figure 9C:
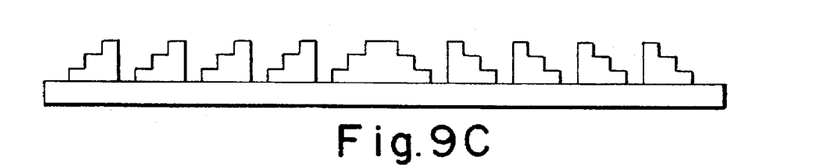
Figure 9D:
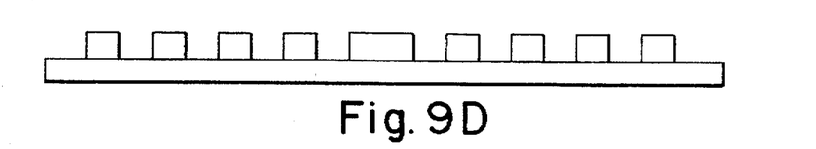

FIGS. 9A–9D illustrate various diffractive feature profiles. In FIG. 9A a triangularly blazed profile (feature) with $h_{max} = \theta_0/[n(\theta_0) - 1]$ will generate the maximum diffraction efficiency in the m=1 order. The profile of FIG. 9B illustrates a triangularly blazed profile with ½ the optimum height. This profile will provide both diffracted and undiffracted light for further blurring of the intensity pattern. The profile of FIG. 9C represents a discrete approximation of a triangularly blazed diffractive feature. The profile of FIG. 9D represents a binary approximation of the triangularly blazed diffractive feature.

Figure 10A:
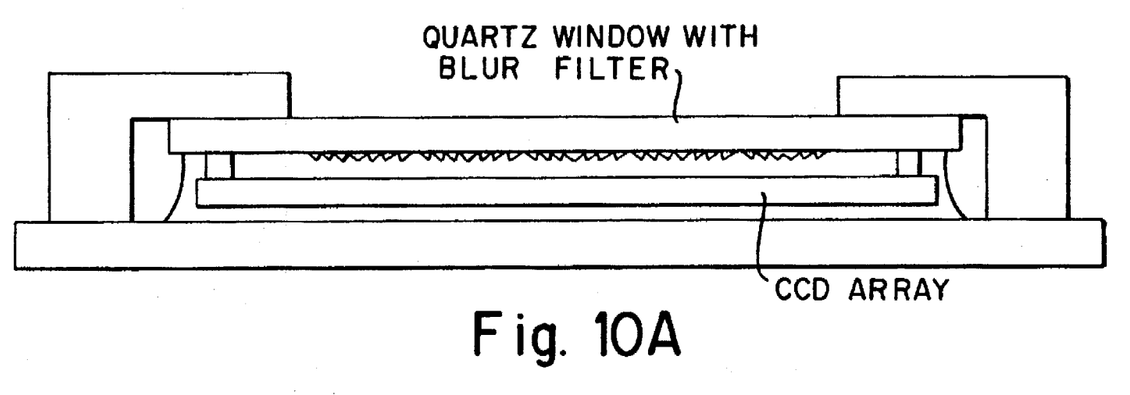
FIGS. 10A and 10B illustrate alternate arrangements of the blur filter in a CCD array package.
Figure 10B:
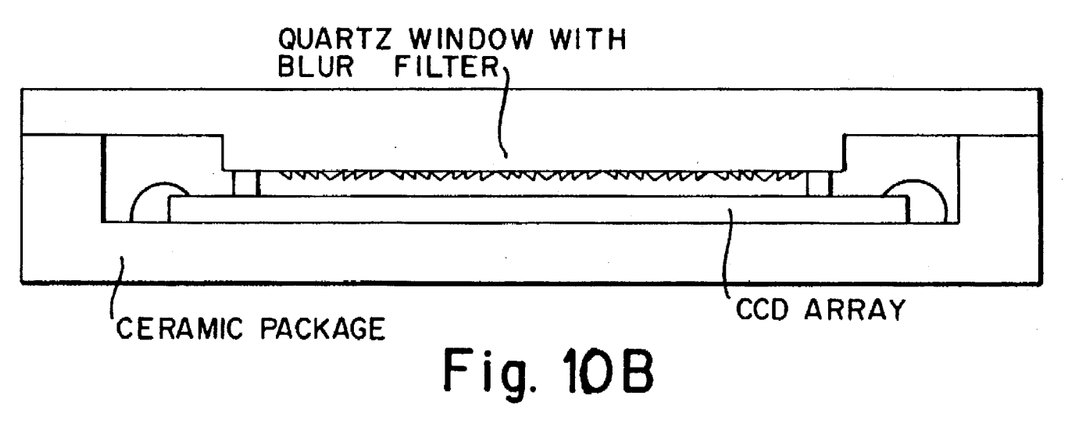

FIGS. 10A and 10B illustrate alternate configurations in the packaging of the blur filter.

The invention has been described with reference to preferred embodiments. However, it will be appreciated that variations and modifications can be effected by a person of ordinary skill in the art without departing from the scope of the invention.

I claim:

1. A blur filter for use with a multi-element electro-optical sensor comprising:

a plurality of diffractive elements positioned adjacent each other, each of said elements comprised of concentric diffractive features with uniform spacing between features;

a multi-element electro-optical sensor wherein each element has a plurality of sensing surfaces each receiving incident light from a plurality of diffractive features; and means for spacing the plurality of diffractive elements in a plane near the sensing surfaces of the multi-element electro-optical sensor.

2. The blur filter according to claim 1 wherein the means for spacing spaces the diffractive elements in a plane that is 500 microns or less from the sensing surface of the multi-element electro-optical sensor.

3. The blur filter according to claim 1 wherein the means for spacing spaces the diffractive elements in a plane that is a distance X from the sensing surface of the multi-element electro-optical sensor wherein X=S*Tan $\theta_x$ and wherein $\theta_x$ equals the angle of diffraction of incident light; and S = the center-to-center spacing between electro-optical sensor elements.

4. A blur filter for use with a multi-element electro-optical sensor comprising:

a plurality of diffractive elements positioned adjacent each other, each of said diffractive elements comprised of concentric diffractive features with uniform spacing between features, each of said diffractive features having a maximum diffractive surface height of $h_{max}=\lambda_o/(n(\lambda_o)-1)$ where $\lambda_o$ is the design wavelength which is at the center of the wavelength region of interest;

a multi-element electro-optical sensor wherein each element has a plurality of sensing surfaces each receiving incident light from a plurality of diffractive features and arranged such that the sensing surfaces are in a plane; and means for spacing the plurality of diffractive elements in a plane near the sensing surfaces of the multi-element electro-optical sensor.

5. A blur filter for use with a multi-element electro-optical sensor comprising:

a plurality of diffractive elements positioned adjacent each other, each of said diffractive elements comprised of concentric diffractive features with uniform spacing between features, each of said diffractive features having a diffractive surface height in the range of $(\frac{1}{4})h_{max}<h<(2)h_{max}$ wherein $h_{max}=\lambda_o/(n(\lambda_o)-1)$ where $\lambda_o$ is the design wavelength which is at the center of the wavelength region of interest;

a multi-element electro-optical sensor wherein each element has a plurality of sensing surfaces each receiving incident light and arranged such that the sensing surfaces are in a plane; and means for spacing the plurality of diffractive elements in a plane near the sensing surfaces of the multi-element electro-optical sensor.

6. A blur filter for use with a multi-element electro-optical sensor comprising:

a plurality of diffractive elements positioned adjacent each other, each of said elements comprised of concentric diffractive features with uniform spacing between features, each of said diffractive elements having a size that is at least 2 times the size of each electro-optical sensor;

a multi-element electro-optical sensor wherein each element has a plurality of sensing surfaces each receiving incident light from a plurality of diffractive features and arranged such that the sensing surfaces are in a plane; and means for spacing the plurality of diffractive elements in a plane near the sensing surfaces of the multi-element electro-optical sensor.

7. The blur filter according to claim 6 wherein said plurality of diffractive elements are arranged in a matrix.

8. The blur filter according to claim 1 wherein each of said plurality of diffractive elements is a series of concentric circles.

9. The blur filter according to claim 1 wherein each of said plurality of diffractive elements is a series of concentric rectangles.

10. The blur filter according to claim 1 wherein each of said plurality of diffractive elements is a series of spaced apart concentric circles.

11. The blur filter according to claim 1 wherein each of said plurality of diffractive elements is a series of spaced apart concentric rectangles.

* * * * *